(12) United States Patent
Chang et al.

(10) Patent No.: US 7,112,905 B2
(45) Date of Patent: Sep. 26, 2006

(54) COUPLING STRUCTURE FOR TANDEM MOTOR

(75) Inventors: Shun-chen Chang, Taipei (TW); Kuo-cheng Lin, Taoyuan (TW); Wen-shi Huang, Taoyuan (TW)

(73) Assignee: Delta Electronics, Inc., (TW)

( * ) Notice: Subject to any disclaimer, the term of this patent is extended or adjusted under 35 U.S.C. 154(b) by 123 days.

(21) Appl. No.: 10/799,017

(22) Filed: Mar. 11, 2004

(65) Prior Publication Data

US 2004/0247383 A1 Dec. 9, 2004

(30) Foreign Application Priority Data

Jun. 6, 2003 (TW) .............................. 92115386 A

(51) Int. Cl.
*H02K 16/00* (2006.01)

(52) U.S. Cl. .................... 310/112; 310/114; 417/423.5; 417/423.12; 403/319; 403/329; 403/332; 403/DIG. 7

(58) Field of Classification Search ............... 403/319, 403/329, 332, DIG. 7; 384/903, 504, 510; 310/112, 114; 417/423.5, 423.12, 354
See application file for complete search history.

(56) References Cited

U.S. PATENT DOCUMENTS

| 2,051,704 | A | * | 8/1936 | Harris ........................ 384/903 |
| 2,897,022 | A | * | 7/1959 | Marola ...................... 384/903 |
| 3,750,489 | A | * | 8/1973 | Caldwell ............... 403/DIG. 7 |
| 6,343,014 | B1 | * | 1/2002 | Lin ............................ 361/697 |
| 6,612,817 | B1 | * | 9/2003 | Lin et al. ................. 417/423.5 |
| 6,790,017 | B1 | * | 9/2004 | Takura et al. ........... 417/423.5 |

* cited by examiner

*Primary Examiner*—Daniel P. Stodola
*Assistant Examiner*—Michael P. Ferguson
(74) *Attorney, Agent, or Firm*—Martine Penilla & Gencarella, LLP

(57) ABSTRACT

A coupling structure for a tandem motor includes two bearing sleeves formed with grooves thereon, a connector and elastic fasteners. The connector has a first end and an opposed second end, and each of the first end and second end is formed with at least one groove. A first elastic fastener is fit into the groove of the connector at the first end and received in the groove formed on one of the two bearing sleeve, and a second elastic fastener is fit into the groove of the connector at the second end and received in the grooves formed on the other bearing sleeve.

20 Claims, 7 Drawing Sheets

US 7,112,905 B2

COUPLING STRUCTURE FOR TANDEM MOTOR

BACKGROUND OF THE INVENTION

A. Field of the Invention

The invention relates to a coupling structure for a tandem motor and, more particularly, to a coupling structure including an elastic fastener fit in the tandem motor.

B. Description of the Related Art

When several fans are combined to generate a large amount of air quantity, the method for directly connecting separate fan housings is generally considered. However, this may need a lot of connection pieces and corresponding joints, making the assembling process complicated and resulting in a high cost. In addition, the reliability of the joints tends to decay because of the continuous vibration, and the connection strength of the whole assembly is deteriorated as a result.

BRIEF SUMMARY OF THE INVENTION

Therefore, an object of the invention is to provide a coupling structure for a tandem motor to serially couple separate fan motors at a low cost, simplified process, and sufficient connection strength.

According to the design of the invention, a coupling structure for a tandem motor includes two bearing sleeves each formed with a groove, a connector and two elastic fasteners. The connector is also formed with two grooves at opposite ends, and the elastic fastener may be a C-shaped retaining ring with an inner edge and an outer edge. Two fan motors can be serially coupled through the connection of the elastic fastener and the two bearing sleeves, with one portion of the elastic fastener fit into the groove on the connector while the remainder received in the groove on the bearing sleeve.

Alternatively, the connector may be directly formed on one bearing sleeve as a connection part, and the connection part may have bevel-shaped or conical-shaped surfaces served as guiding surfaces for the coupling process of the two bearing sleeves.

Through the design of the invention, the connection of the two bearing sleeves can be easily achieved by the elastic fastener to serially couple separate fan motors, and thus separate fans are combined at a low cost, simplified process, and sufficient connection strength.

DETAILED DESCRIPTION OF THE INVENTION

Figure 1:
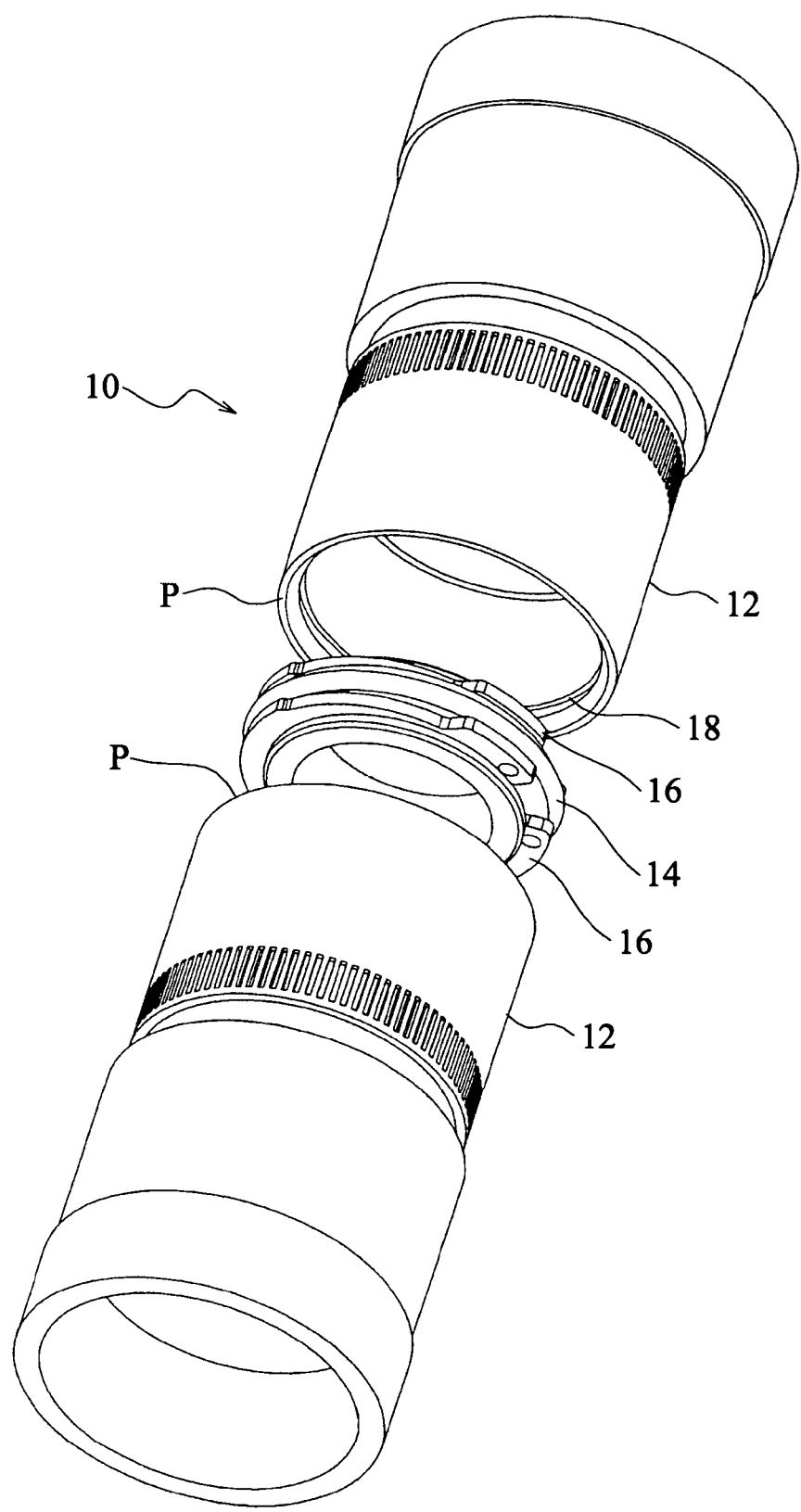
FIG. 1 is a perspective view showing a coupling structure for a tandem motor according to an embodiment of the invention.

FIG. 1 is a perspective view showing a coupling structure 10 for a tandem motor according to an embodiment of the invention. Referring to FIG. 1, the coupling structure 10 for the tandem motor includes two bearing sleeves 12, a connector 14 and two C-shaped retaining rings (C-rings) 16. The bearing sleeves 12 are inherent parts of fan motors (not shown) that are to be serially coupled. The bearing sleeves 12 may be made of metal, such as copper, or engineering plastics. Each of the bearing sleeves 12 is formed with a ring-shaped groove 18 on its inner surface, with the ring-shaped groove 18 keeping a predetermined distance from the end surface P of the bearing sleeve 12.

Figure 2:
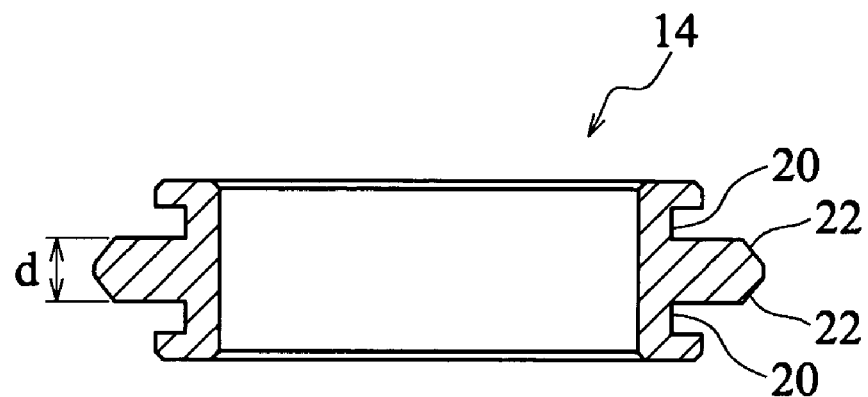
FIG. 2 is a schematically sectional view showing a connector according to an embodiment of the invention.

FIG. 2 is a schematically sectional view showing the connector 14 of the invention. As shown in FIG. 2, the connector 14 is formed with two ring-shaped grooves 20 at opposite ends, and that portion having a thickness d between two ring-shaped grooves 20 is formed with two leading edges at its upper and lower ends to create inclined guiding surfaces 22.

Figure 3:
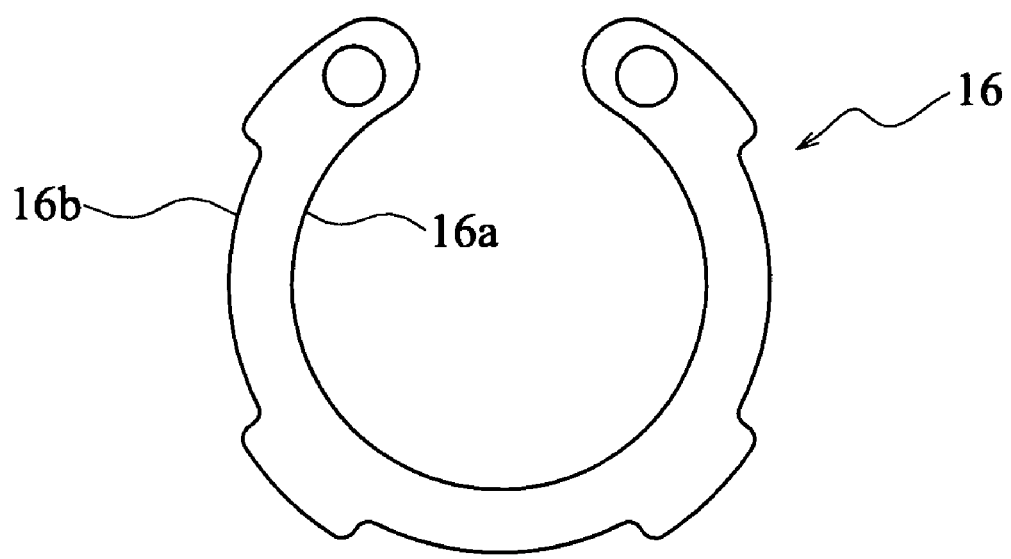
FIG. 3 is a top view showing a C-shaped retaining ring according to an embodiment of the invention.

Referring to FIG. 3, the C-ring 16 used in this embodiment is a ring-shaped resilient member having an inner edge 16a, an outer edge 16b and an opening. When an external force is applied to the C-ring 16, it may extend outwardly or shrank inwardly; once removed, it recovers original shape through its inherent resilience.

Figure 4A:
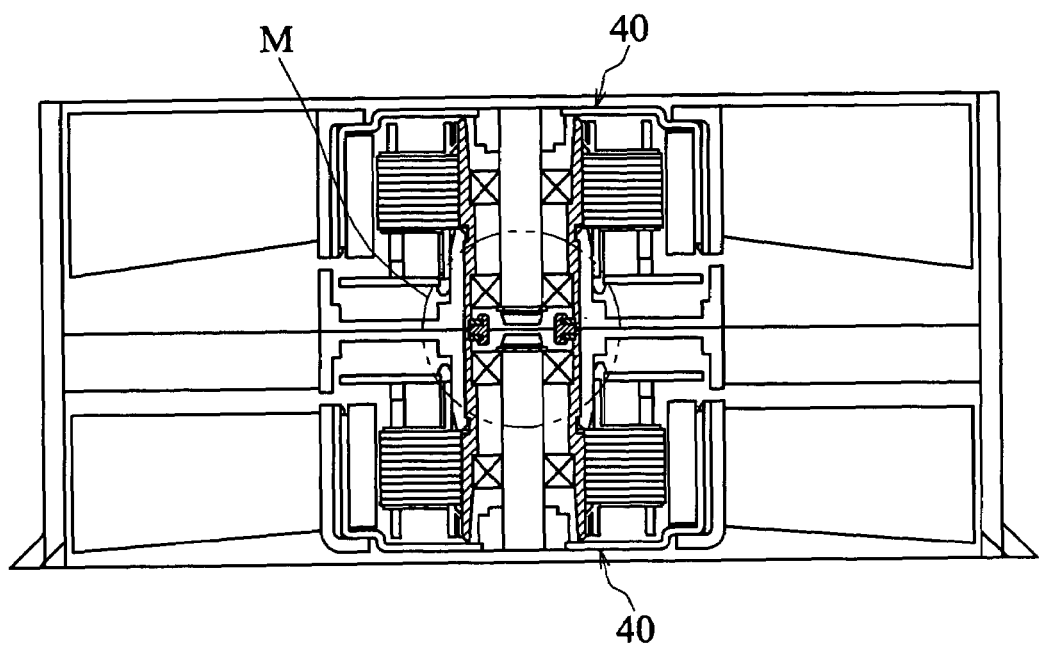
FIG. 4A is a schematically sectional view showing a combination of two fan motors according to an embodiment of the invention.
Figure 4B:
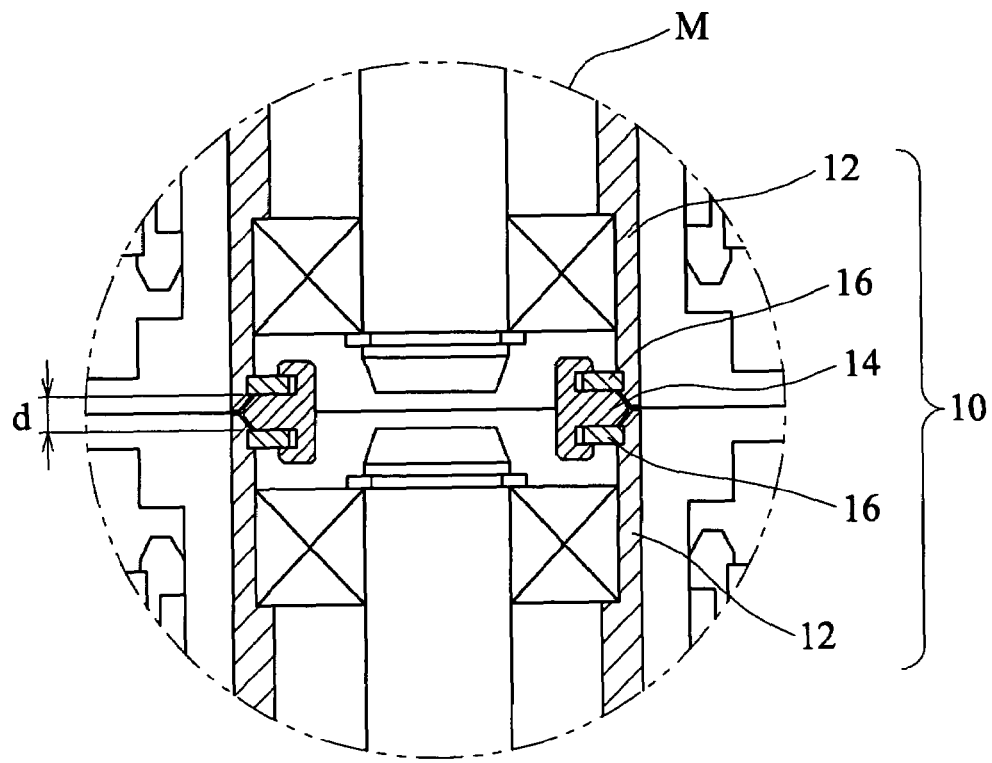
FIG. 4B is a partially enlarged view M of FIG. 4A.

FIG. 4A is a schematically sectional view showing a combination of two fan motors 40, and FIG. 4B is a partially enlarged view M of FIG. 4A. Referring to FIG. 4B, first, the thickness d between the two grooves 20 of the connector 14 is designed to equal a sum of two predetermined distances, each measured from the groove 18 to the end surfaces P of the bearing sleeve 12. Hence, when the inner edges 16a of the two C-rings 16 are fit into the ring-shaped grooves 20 at opposite ends of the connector 14, and the outer edges 16b of them are received in the ring-shaped grooves 18 of the two bearing sleeves 12, the two fan motors 40 are serially coupled.

Through the design of the invention, it is quite simple to form a tandem motor by the C-rings 16 engaged with grooves both on each bearing sleeves 12 and the connector 14, thus simplifying the assembling process and reducing the cost for serially coupling the fan motors. In addition, the joints of the fan motors to be coupled are concentrated on the C-rings 16 to enhance the connection strength of the tandem motor. Therefore, through the invention, separate fans are combined at a low cost, simplified process, and sufficient connection strength.

Figure 5:
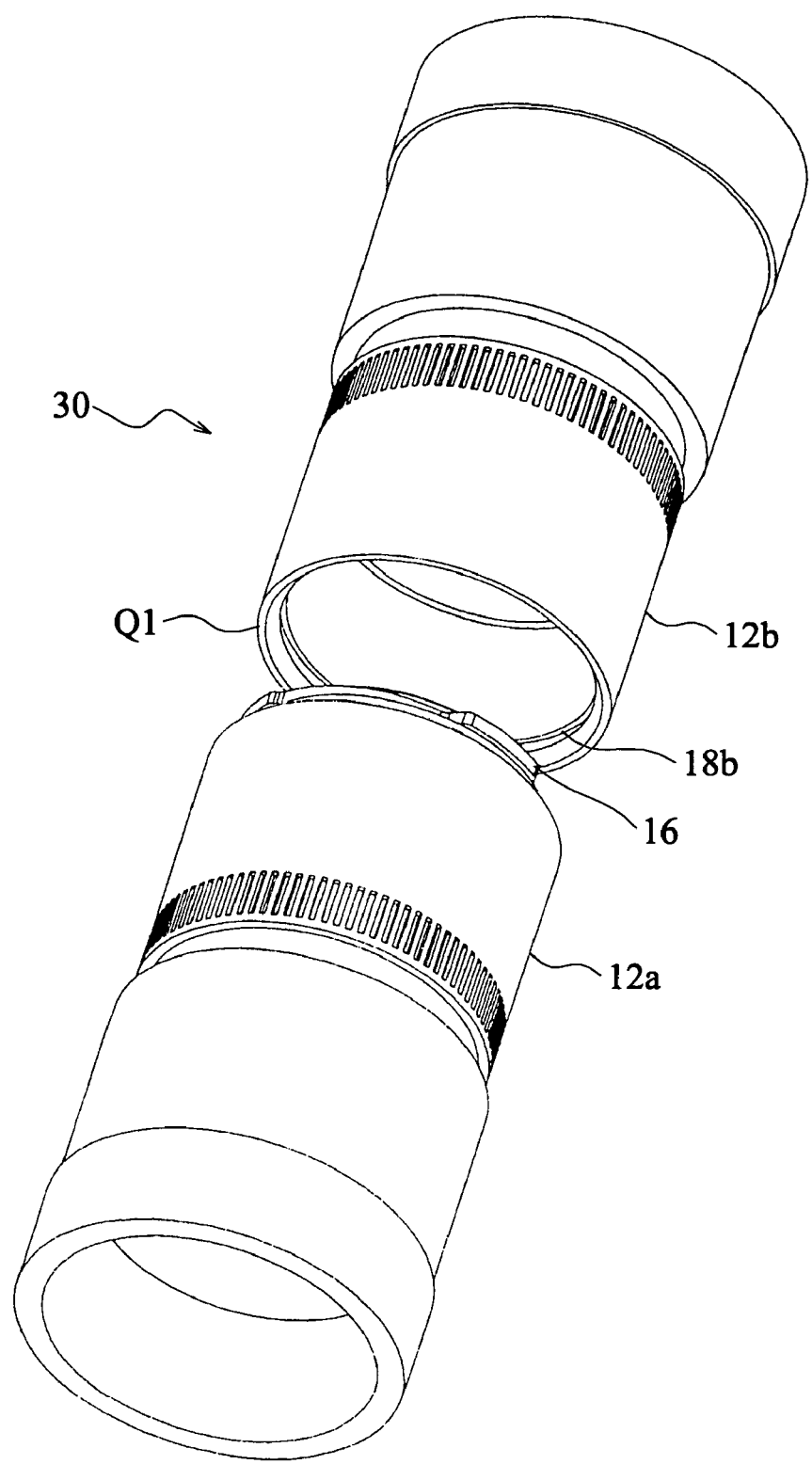
FIG. 5 is a perspective view showing a coupling structure for a tandem motor according to another embodiment of the invention.

FIG. 5 is a perspective view showing a coupling structure for a tandem motor according to another embodiment of the invention. Referring to FIG. 5, the coupling structure 30 for a tandem motor includes a bearing sleeve 12a, bearing sleeve 12b and C-ring 16. The bearing sleeves 12a and 12b are inherent parts of the fan motors (not shown) that are to be serially coupled. A ring-shaped groove 18b is formed on the inner surface of the bearing sleeve 12b, keeping a predetermined distance from the end surface Q1 of the bearing sleeve 12b.

Figure 6:
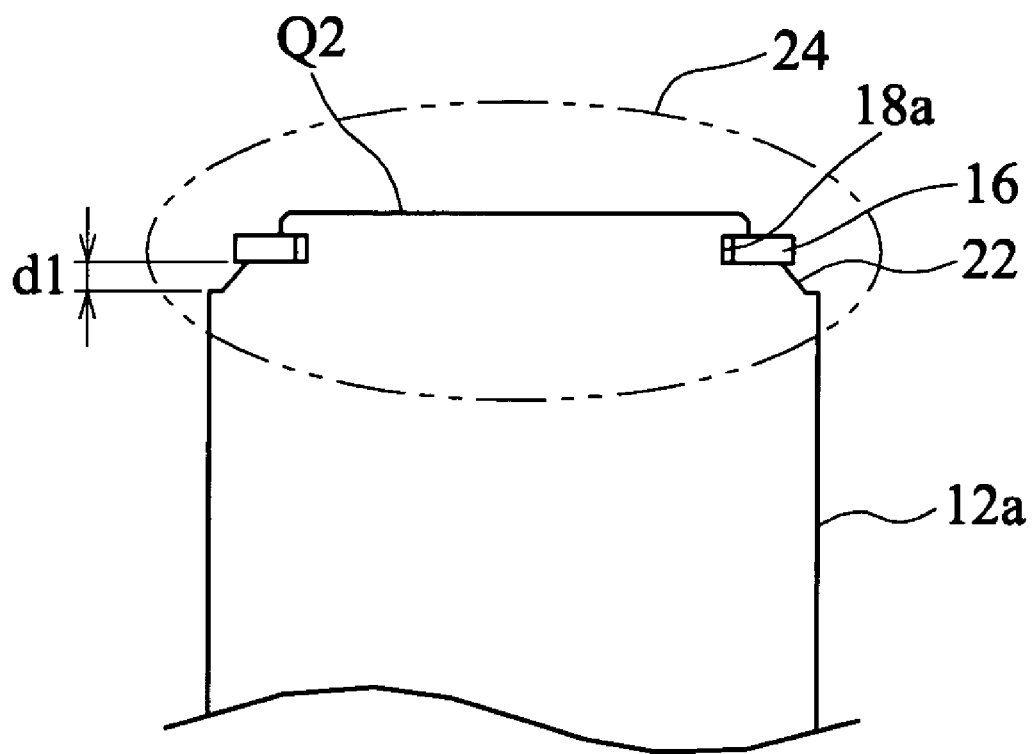
FIG. 6 is a cross-sectional view showing a bearing sleeve formed with a connection part according to another embodiment of the invention.

Referring to FIG. 6, the bearing sleeve 12a is particularly formed with a connection part 24 at one end thereof, and a ring-shaped groove 18a is formed on the outer surface of the connection part 24 at a distance from the end surface Q2 of the connection part 24. Also, the connection part 24 is formed with a leading edge 22 to create an inclined guiding surface 22. According to this embodiment, the height d1 of the guiding surface 22 is configured to equal the predetermined distance measured from the groove 18b of the bearing sleeve 12b to the end surface Q1.

Figure 7A:
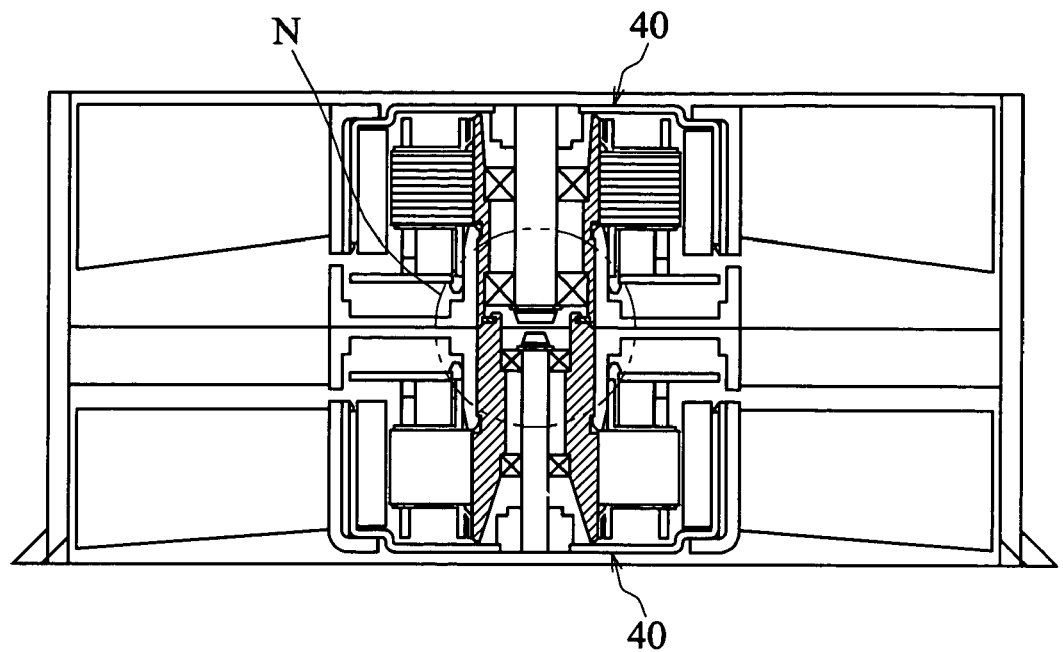
FIG. 7A is a schematically sectional view showing a combination of two fan motors according to another embodiment of the invention.
Figure 7B:
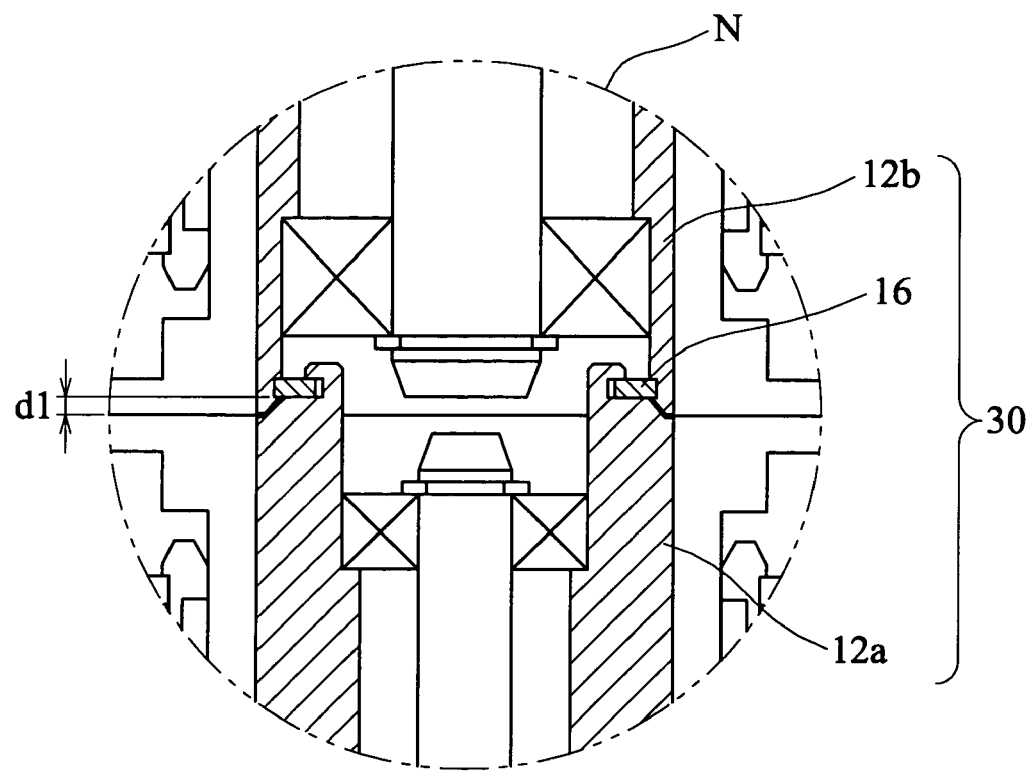
FIG. 7B is a partially enlarged view N of FIG. 7A.

FIG. 7A is a schematically sectional view showing the combination of two fan motors 40, and FIG. 7B is a partially enlarged view N of FIG. 7A. As shown in FIG. 7B, the height d1 of the guiding surface 22 is configured to equal the predetermined distance measured from the groove 18b to the end surface Q1. Hence, when the inner edge 16a of the C-ring 16 is fit into the groove 18a of the connection part 24 of the bearing sleeve 12a and the outer edge 16b of it is received in the ring-shaped groove 18b of the bearing sleeve 12b, the two fan motors 40 are serially coupled.

According to this embodiment, the two motors 40 are serially coupled by the C-ring 16 and the connection part 24, a substitute for the separate connector 14, with the connection part 24 integrally formed on one of the bearing sleeves. Also, it can be understood that such way of forming an connection part well suits the case that the two bearing sleeves to be coupled have a different wall thickness, and we have only to integrally form the connection part 24 on the bearing sleeve having larger wall thickness.

As described above, since the positions of the grooves formed on both the connector and the bearing sleeves may be selected arbitrarily, the design of the invention is easy to apply to various kinds of fan motors when the shape of the connector is well defined.

Further, the elastic fastener used in this invention is not limited to a C-ring, but may be any resilient members capable of fitting into corresponding grooves. Preferably, the resilient member is configured as a ring shape to match with the profile of the ring-shaped bearing sleeve so as to provide more contact areas.

Figure 8A:
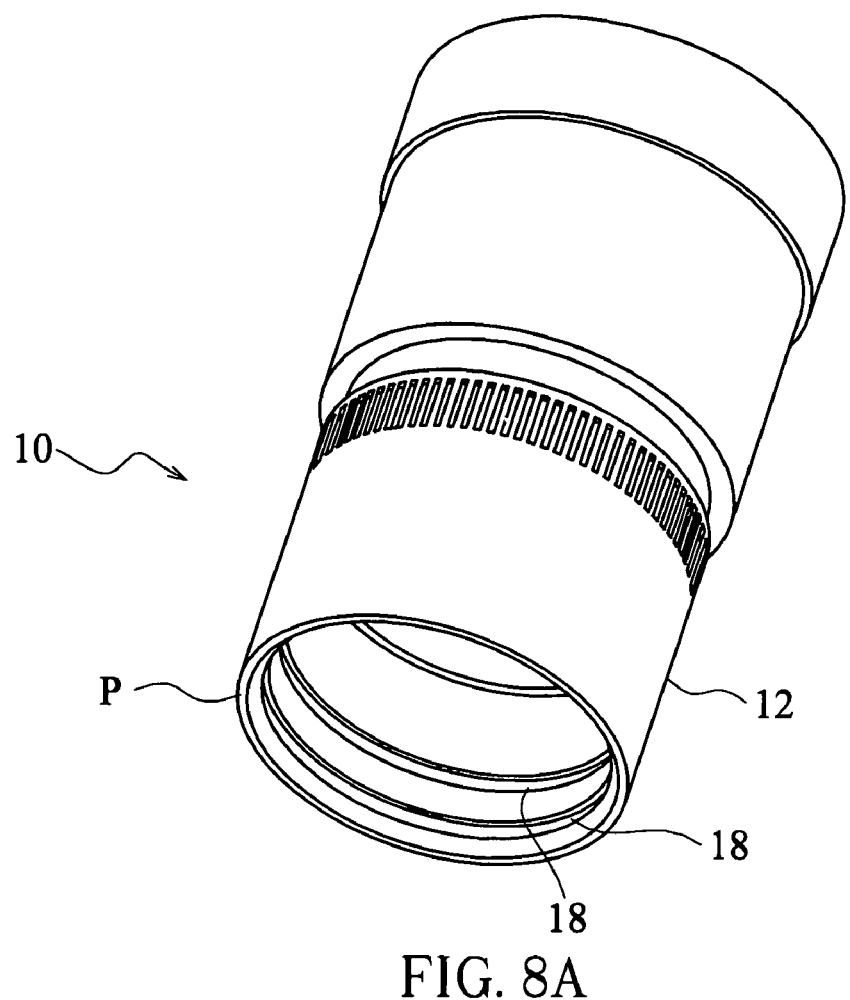
FIG. 8A is a schematically view showing a modification of a bearing sleeve.
Figure 8B:
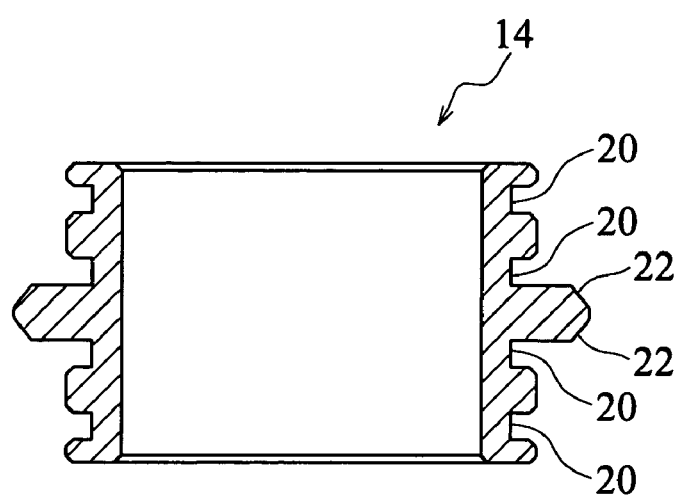
FIG. 8B is a schematically sectional view showing a modification of a connector.

In addition, as shown in FIGS. 8A and 8B, the number of the grooves 18 formed on each bearing sleeve 12 and the grooves 20 on each side of the connector 14 is not restricted to one. Instead, a plurality of grooves may be formed to allow the selection of positions where the elastic fastener is engaged. Besides, the number of the elastic fasteners is not restricted, and can be determined according to the number of the grooves and the desired connection strength.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A motor assembly, comprising:
   two motors each including a shaft;
   two bearing sleeves each formed with at least one inner groove and respectively disposed in one of the two motors, wherein each bearing sleeve is coupled to the corresponding shaft through at least one bearing disposed on the shaft;
   a connector having a first end and an opposed second end, the first end and the second end each formed with at least one outer groove;
   a first elastic fastener fit into the outer groove of the connector at the first end and received in the inner groove formed on one of the two bearing sleeves; and
   a second elastic fastener fit into the outer groove of the connector at the second end and received in the inner groove formed on the other bearing sleeve.

2. The motor assembly according to claim 1, wherein the grooves formed on the bearing sleeves and the connector are ring-shaped.

3. The motor assembly according to claim 1, wherein the first and the second elastic fasteners are ring-shaped.

4. The motor assembly according to claim 1, wherein the first and the second elastic fasteners are C-shaped retaining rings.

5. The motor assembly according to claim 1, wherein the material of the bearing sleeves is selected from the group consisting of metal and engineering plastic.

6. The motor assembly according to claim 1, wherein the bearing sleeves are copper sleeves.

7. The motor assembly according to claim 1, wherein the connector is formed with a leading edge to create an guiding surface between the outer grooves.

8. The motor assembly according to claim 7, wherein the guiding surface is an inclined surface.

9. A motor assembly, comprising:
   two motors each including a shaft;
   two bearing sleeves each formed with at least one groove on the inner surface of the bearing sleeve and respectively disposed in one of the two motors, wherein each bearing sleeve is coupled to the corresponding shaft through at least one bearing disposed on the shaft;
   a connector having a first end and an opposed second end, the first end and the second end each formed with at least one outer groove; and
   at least two ring-shaped elastic fasteners, each of which has an inner edge fit into one of the outer grooves formed at the first and second end of the connector and an outer edge received in the groove formed on one of the bearing sleeves.

10. The motor assembly according to claim 9, wherein the grooves formed on the bearing sleeves and the connector are ring-shaped.

11. The motor assembly according to claim 9, wherein the material of the bearing sleeves is selected from the group consisting of metal and engineering plastic.

12. The motor assembly according to claim 9, wherein the connector is formed with a leading edge to create an guiding surface between the outer grooves.

13. The motor assembly according to claim 12, wherein the guiding surface is an inclined surface.

14. A motor assembly, comprising:
   two motors each including a shaft;
   a first bearing sleeve having one end formed with a connection part, the connection part being formed with at least one groove in its outer surface, and the first bearing sleeve is disposed in one of the two motors, wherein the first bearing sleeve is coupled to the corresponding shaft through at least one first bearing disposed on the shaft;
   a second bearing sleeve formed with at least one groove on its inner surface and disposed in the other of the two motors, wherein the second bearing sleeve is coupled to the corresponding shaft through at least one second bearing disposed on the shaft; and at least one ring-shaped elastic fastener having an inner edge fit into the groove formed on the connection part of the first bearing sleeve and an outer edge received in the groove formed on the second bearing sleeve.

15. The motor assembly according to claim 14, wherein the connection part is formed with a leading edge to create an inclined guiding surface.

16. The motor assembly according to claim 14, wherein the grooves formed on the bearing sleeves and the connection part are ring-shaped.

17. The motor assembly according to claim 14, wherein the ring-shaped elastic fastener is a C-shaped retaining ring.

18. The motor assembly according to claim 14, wherein the first and second bearing sleeve are made of metal.

19. The motor assembly according to claim 18, wherein the first and second bearing sleeve are copper sleeves.

20. The motor assembly according to claim 14, wherein the first and second bearing sleeve are made of engineering plastics.

* * * * *